United States Patent
Hansen et al.

(10) Patent No.: US 11,733,411 B1
(45) Date of Patent: Aug. 22, 2023

(54) CLAMSHELL MECHANISM FOR TOWED ARRAY BOOTABLE BULKHEAD

(71) Applicant: The United States Government of America as represented by the Secretary of the Navy, Newport, RI (US)

(72) Inventors: Thomas E Hansen, Newport, RI (US); Charles K Boyle, North Kingstown, RI (US); Alia W Kroger, Middletown, RI (US)

(73) Assignee: The United States of America as represented by the Secretary of the Navy

(*) Notice: Subject to any disclaimer, the term of this patent is extended or adjusted under 35 U.S.C. 154(b) by 224 days.

(21) Appl. No.: 17/381,226

(22) Filed: Jul. 21, 2021

(51) Int. Cl.
*G01V 1/20* (2006.01)
*G01V 1/38* (2006.01)

(52) U.S. Cl.
CPC ............. *G01V 1/202* (2013.01); *G01V 1/38* (2013.01); *G01V 2210/1293* (2013.01)

(58) Field of Classification Search
CPC ... G01V 1/202; G01V 1/38; G01V 2210/1293
See application file for complete search history.

(56) References Cited

U.S. PATENT DOCUMENTS

| | | | | |
|---|---|---|---|---|
| 4,260,211 A | * | 4/1981 | Mollere | G01V 1/201 439/348 |
| 4,351,036 A | * | 9/1982 | Mollere | H01R 13/523 367/20 |
| 4,375,089 A | * | 2/1983 | Thigpen | G01V 1/3835 367/20 |
| 4,479,685 A | * | 10/1984 | Kirby | H01R 11/30 439/291 |
| 5,923,616 A | * | 7/1999 | Badger | G01V 1/201 367/16 |
| 6,091,670 A | * | 7/2000 | Oliver | G01V 1/22 367/20 |
| 6,292,436 B1 | * | 9/2001 | Rau | G01V 1/3826 367/149 |
| 6,483,775 B1 | * | 11/2002 | Spackman | G01V 1/201 367/19 |
| 10,088,589 B2 | * | 10/2018 | Tenghamn | G01V 1/202 |
| 2008/0181717 A1 | * | 7/2008 | Olivier | G01V 1/201 403/24 |

* cited by examiner

*Primary Examiner* — Daniel Pihulic
(74) *Attorney, Agent, or Firm* — James M. Kasischke; Michael P. Stanley

(57) ABSTRACT

A connector is provided with a forward bulkhead assembly having a forward bulkhead device and an aft bulkhead assembly having an aft bulkhead device. Each of the forward bulkhead assembly and the aft bulkhead assembly includes connections for wires and optical fibers of an acoustic array. The forward bulkhead assembly includes a clamshell-type ring of two halves on opposite sides of the forward bulkhead assembly. The clamshell has a locking feature and a locking ring attached to the locking feature. The locking ring connects the forward bulkhead assembly with the aft bulkhead assembly.

13 Claims, 5 Drawing Sheets

CLAMSHELL MECHANISM FOR TOWED ARRAY BOOTABLE BULKHEAD

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

CROSS REFERENCE TO OTHER PATENT APPLICATIONS

None.

BACKGROUND OF THE INVENTION

1) Field of the Invention

The present invention is directed to towed array modules and more particularly, to a clamshell mechanism for joining modular arrays by using bootable bulkhead assemblies.

DESCRIPTION OF THE PRIOR ART

Arrays of hydrophones are towed for sensing sound below the surface of the ocean. Typically, such arrays are linear assemblies of modules with each module having sections that have a bulkhead at opposing ends.

Hydrophones are mounted in the sections. Sound pressure waves in the ocean pass through the wall of various sections where the hydrophones sense pressure fluctuations and transform the sensed pressures into electrical signals which are transmitted to a support vessel.

Submarines can deploy a thin-line towed-array (TLTA) using mechanical handling systems. Each module of the thin-line array includes an outer sheath or hose that contains the hydrophones and supporting electronics. Standard thin-line towed-arrays have historically poor reliability. This is due to the mechanical stresses induced on the electrical and optical data paths during booting of the array module.

Booting is the process of pulling a pre-hose assembly of the towed array into the hose to create the final module assembly. The pre-hose assembly includes electrical and optical harnesses, telemetry units, internal strength members, and other components that constitute the functional elements along with strength members to carry tension across each module of the array.

To pull the pre-hose assembly into the hose of the TLTA module, the hose is inflated beyond a nominal, non-pressurized inner diameter in order to reduce friction between the pre-hose assembly and the inside wall of the hose. Typically, each end of the pre-hose assembly terminates with a coupling, usually referred to as a bulkhead. However, the couplings at the ends of each module are too large to fit through the ends of the hose. Therefore, one end of the pre-hose assembly may be constructed without the wires and optical fibers terminated into the connector insert and bulkhead. This end is pulled into the hose first and through to the other end of the hose until the terminated end of the pre-hose assembly seats in the coupling.

Once the first end bulkhead seats in the coupling; the other end of the pre-hose assembly terminates in the connector insert and bulkhead. An excess length of wire and fiber is free from the hose for terminating the second end. As a result, the pre-hose assembly is longer than the hose.

The hose is then elongated over the pre-hose assembly until the other end of the unseated bulkhead seats in the coupling. Occasionally, the final inches of the pre-hose assembly must be reinserted into the hose by hand. In either case, the wires and fibers in the excess pre-hose assembly may wrinkle and fold inside the hose; thereby, subjecting the wires and fibers to stresses that contribute to poor towed array reliability.

It is thus desirable to have an improved mechanical design and fabrication method for constructing towed array assemblies that does not require an extra length of the pre-hose assembly. Both ends of the pre-hose assembly could be terminated and seated in the coupling prior to booting.

SUMMARY OF THE INVENTION

The present invention discloses a bootable bulkhead in which the wires and fibers pre-terminate in the connector insert and bulkhead before the booting process. This pre-termination eliminates the need to pull excess pre-hose material through the hose. The pre-hose can be shortened in relation to the hose such that both bulkheads can be seated at the same time; thereby, reducing wire and fiber stresses introduced through excess lengths and pulling back into the hose. Since some frictional buildup will remain between the pre-hose assembly and the hose walls; some excess length is required to account for hose stretch caused by the induced tension from the friction.

The clamshell bulkhead addresses these problems by replacing the sealing surface and threaded ring with a clamshell-type mechanism. In the invention, a connector includes a forward bulkhead assembly having a forward bulkhead device and an aft bulkhead assembly having an aft bulkhead device. Each of the forward bulkhead assembly and the aft bulkhead assembly includes connections for wires and optical fibers of an acoustic array.

The forward bulkhead assembly includes a clamshell of two halves on opposite sides of the forward bulkhead assembly. The clamshell has a locking feature and a locking ring attached to the locking feature. The locking ring connects the forward bulkhead assembly with the aft bulkhead assembly.

According to another aspect of the invention, a hose connector includes a forward bulkhead assembly. The forward bulkhead assembly has a forward bulkhead device with a clamshell having two halves on opposite sides of the forward bulkhead device. The clamshell has a locking feature. A locking ring is attached to the locking feature. A first hose coupling surrounds the forward bulkhead assembly. The first hose coupling connects to a first end of a hose.

The hose connector also includes an aft bulkhead assembly. The aft bulkhead assembly has an aft bulkhead device with a second hose coupling surrounding the aft bulkhead assembly. The second hose coupling is connected to a second end of the hose. The locking ring connects the forward bulkhead assembly with the aft bulkhead assembly.

In a hydrophone module, a housing tube includes an elongated sleeve having a first end and a second end. A forward bulkhead assembly having a first hose coupling is connected to a first end of the housing tube. An aft bulkhead assembly having a second hose coupling is connected to a second end of the housing tube. The forward bulkhead assembly includes a forward bulkhead device with a clamshell having two halves on opposite sides of the forward bulkhead device and a locking ring to connect the forward bulkhead assembly with an adjacent aft bulkhead assembly.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The clamshell mechanism for a towed array bootable bulkhead allows for booting of a Thin Line Towed Array (TLTA) with the connector insert pre-populated inside the bulkhead. The invention uses a clamshell-type ring mechanism to increase the reliability of the connection by reducing the number of sealing surfaces and threaded surfaces. Previous sealing surfaces could be susceptible to potential failure through leaking.

Additionally, a previously threaded surface could be susceptible to potential failure through thread stripping. The clamshell-type ring mechanism can be used for a standard 1.5 inch TLTA, as well as thinner sized bulkheads, and for up to 3 inch 'Fat Line' array bulkheads, or larger.

Figure 1:
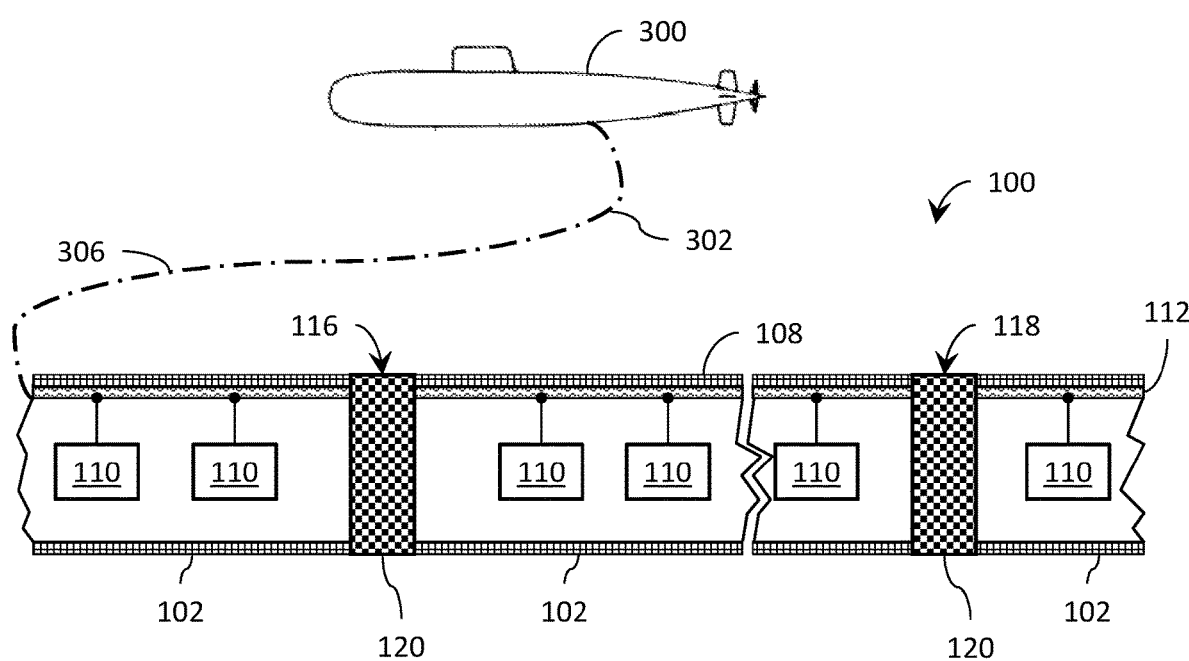
FIG. 1 is a sectional view of a towed array system of the present invention.

Referring to the drawings, FIG. 1 depicts a towed array 100. The towed array 100 contains a linear series of modules 102 in which the modules couple together. The array 100 is towed from a vessel 300, such as a surface ship or a submarine, by using a cable 302.

Each of the modules 102 has a housing formed by a flexible hose 108. The flexible hose 108 may be made from an elastomer or plastic and may be reinforced, such as with Kevlar™ fibers or other suitable fibers. For a thin-line towed array, the hose section for each module 102 is typically one and one-half inch or less in diameter and has a length of 30 to 250 feet.

Hydrophones 110 are disposed in each of the modules 102. The modules 102 couple together to form the array 100. The hydrophones 110 communicate via a harness 112 inside the flexible hose 108, which connects to a transmission line 306 within the cable 302.

Sound pressure waves in the ocean pass through the wall of various modules 102 where the hydrophones 110 sense the pressure fluctuations and transform the sensed pressures into signals that are transmitted via the cable 302 back to the vessel 300. The transmission line 306 may be an electric and/or optical conduit for relaying signals from the array 100 via the harness 112 to the vessel 300. The signals are then processed to provide a representation of the underwater sound.

The flexible hose 108 for each module has a first end 116 and a second end 118, referred to herein as the forward end (corresponding to 116) and the aft end (corresponding to 118). Typically, the ends of the modules 102 are sealed at each of opposing ends by a connector 120. The connector 120 is constructed of two halves, which are described in detail below.

The connector 120 includes forward and aft couplings and forward and aft bulkheads. The harness 112 can be attached to the bulkheads. The connectors 120 permit mating of adjacent modules 102 and allow the signals from the hydrophones 110 to pass therethrough as if the harness 112 were continuous.

Each module 102 for a towed array 100 is formed by pulling a pre-hose assembly into the flexible hose 108 to create a final assembly. The pre-hose assembly comprises the hydrophones, electrical and/or optical harnesses, telemetry units and other components that constitute the functional elements of each module 102. To pull the pre-hose assembly into the flexible hose 108; the flexible hose is inflated beyond a non-pressurized inner diameter. Typically, bulkheads at the end of each module 102 are too large to fit through the ends of the flexible hose 108; therefore, each end of the pre-hose assembly is terminated with a coupling.

Figure 2:
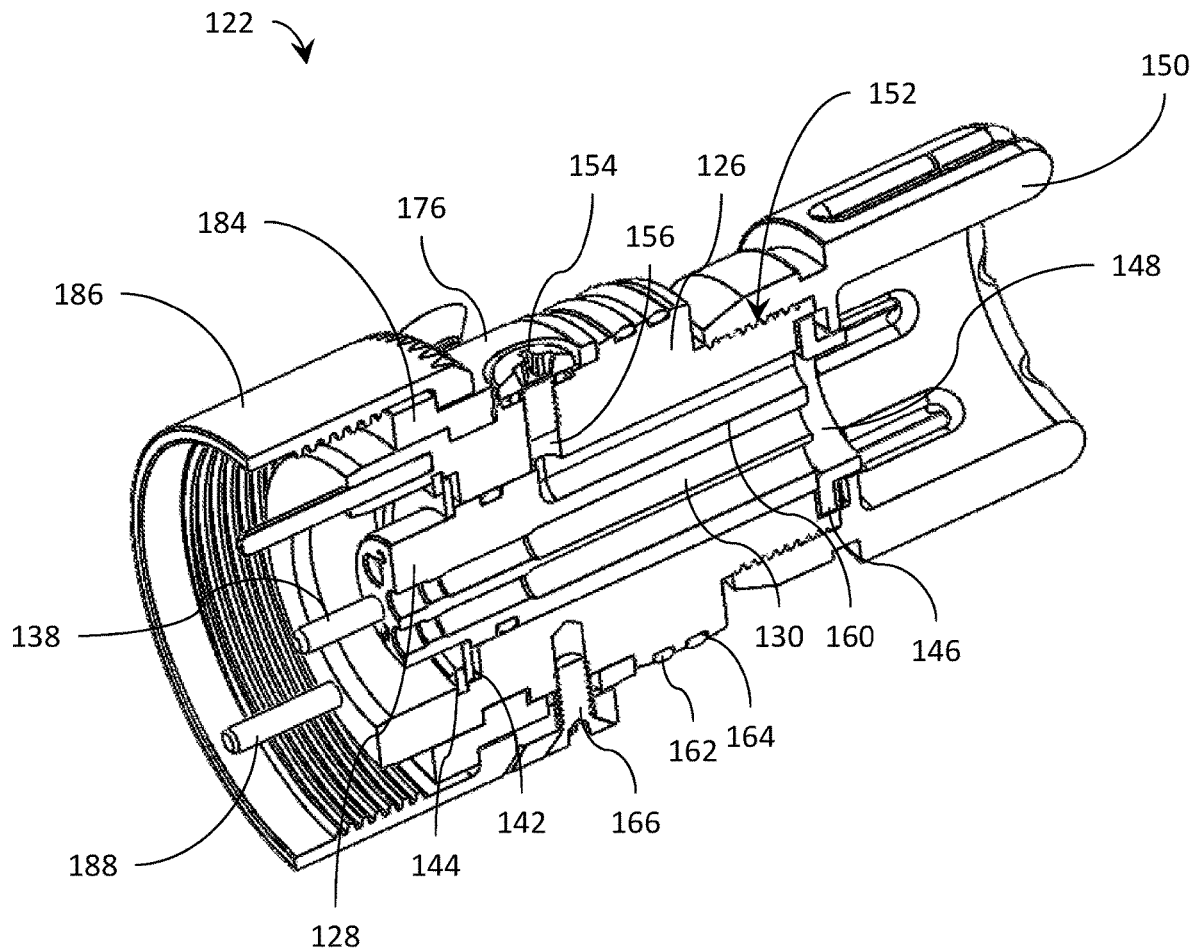
FIG. 2 is a cross-section view of a forward bulkhead of the present invention.
Figure 3:
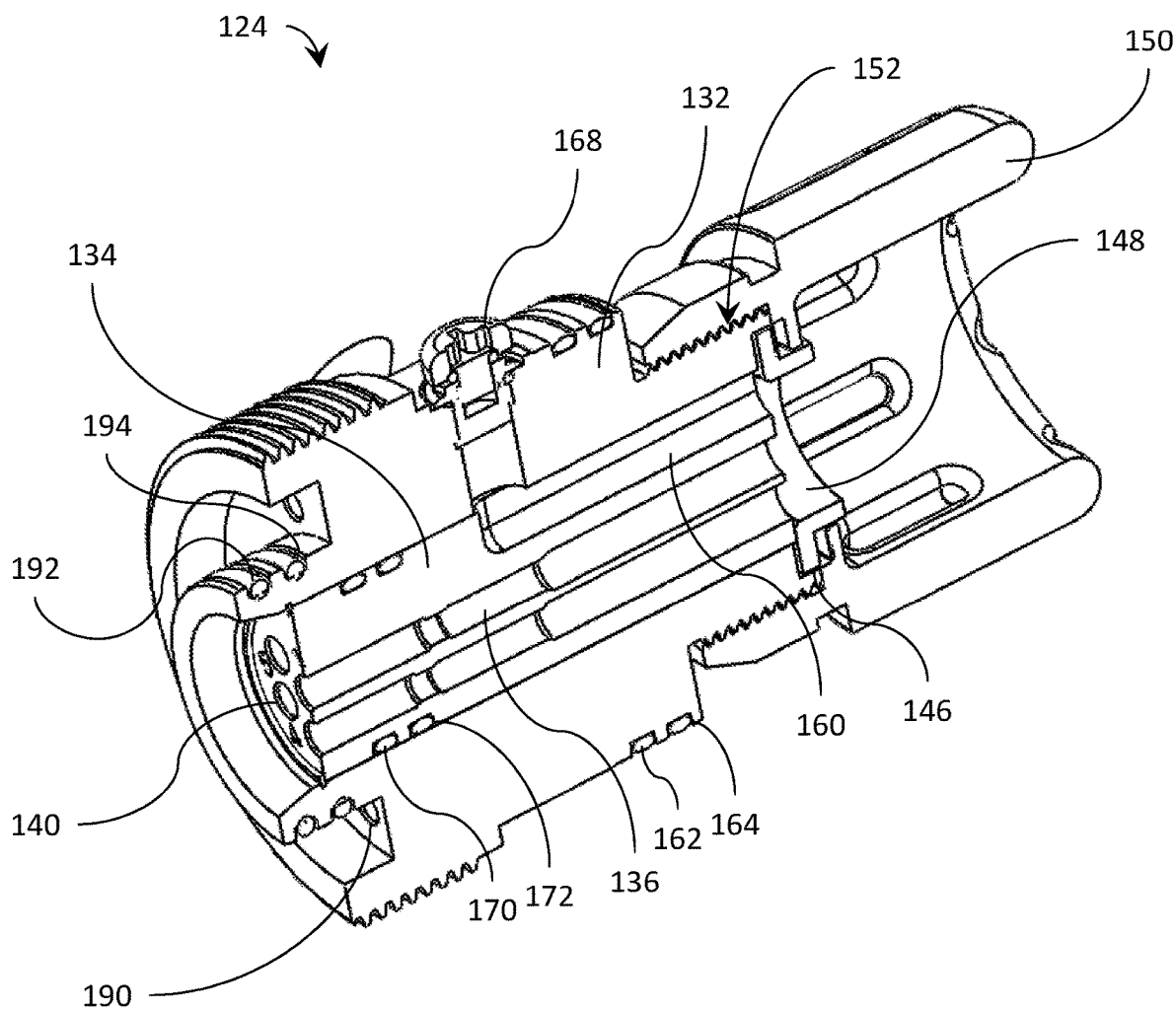
FIG. 3 is a cross-section view of an aft bulkhead of the present invention.

As mentioned above, the connector 120 has two halves, the forward bulkhead assembly and the aft bulkhead assembly, which reside on the forward and aft ends of each array module 102, respectively. FIG. 2 and FIG. 3 depict each half of the connector 120. FIG. 2 depicts a forward bulkhead assembly 122 and FIG. 3 depicts an aft bulkhead assembly 124.

Each of the forward bulkhead assembly 122 and the aft bulkhead assembly 124 includes connections for wires and optical fibers of the towed array 100. The forward bulkhead assembly 122 includes a forward bulkhead device 126. A forward electrical insert 128 for the wires and optical fibers carrying the optic/electrical signals of an acoustic array is housed in the forward bulkhead device 126. The wires and optical fibers are terminated by pins 130 installed in the forward electrical insert 128.

In a similar manner, the aft bulkhead assembly 124 of FIG. 3 includes an aft bulkhead device 132. An aft electrical insert 134 for the remaining end of the wires and optical fibers carrying the optic/electrical signals of an acoustic array is housed in the aft bulkhead device 132. The wires and optical fibers are terminated by pins 136 installed in the aft electrical insert 134.

The forward electrical insert 128 includes an alignment feature 138, such as a pin extending from the forward electrical insert 128, and the aft electrical insert 134 includes an alignment aperture or hole 140 corresponding to the alignment pin to align the forward electrical insert and the aft electrical insert during bulkhead mating. The alignment of the forward electrical insert 128 and the aft electrical insert 134 is kept in place relative to the aft bulkhead device 132 by these alignment features.

The forward electrical insert 128 is secured from falling out of the forward bulkhead device 126 by a retaining snap-ring 142 and a retaining ring washer 144. The internal end of the forward electrical insert 128 is held in at a specified pressure by wavy washer 146 which sits against a bushing 148. The bushing 148 is held in place by a clevis 150. The clevis 150 is threadedly engaged with the forward bulkhead device 126. For this purpose, the clevis 150 may have female threads, engaging male threads 152 or similar mechanism on the forward bulkhead device 126. The clevis 150 is also used to connect the forward bulkhead assembly 122 to strength members of the TLTA.

The forward bulkhead assembly 122 includes a screw plug 154 mounted in the forward bulkhead device 126 so that oil can be filled or drained through the forward bulkhead device via a fill port 156. The screw plug 154 typically includes an o-ring (not shown). The forward electrical insert 128 may have an oil-passage groove 160 so that oil may freely move past the forward electrical insert 128. O-rings 162 may be installed in grooves 164 so that the oil within the forward bulkhead assembly 122 is sealed from the external environment when installed in the hose 108. Radial screws 166 affix the forward bulkhead assembly 122 to the hose 108.

Referring again to FIG. 3, the aft bulkhead assembly 124 is similar to the forward bulkhead assembly 122. As described above, the aft bulkhead device 132 encloses the aft electrical insert 134. The aft bulkhead assembly 124 includes features similar to the forward bulkhead assembly 122, such as the wavy washer 146 which sits against the bushing 148, which is held in place by the clevis 150. The clevis 150 may be threadedly engaged with the aft bulkhead device 132.

For this purpose, the clevis 150 may have female threads engaging male threads 152 or a similar mechanism on the aft bulkhead device 132. This clevis 150 is also used to connect the aft bulkhead assembly 124 to strength members of the TLTA. The aft bulkhead device 132 also includes an oil-passage groove 160 so that oil may freely move past the aft electrical insert 134.

Filling and draining of the aft bulkhead assembly 124 uses a check valve 168. The aft electrical insert 134 is sealed by an o-ring 170 in a groove 172. Similar to the forward bulkhead device 126, the aft bulkhead device 132 includes O-rings 162 installed in grooves 164 so that the oil within the aft bulkhead assembly 124 is sealed from the external environment when installed in the hose 108. Radial screws 166 (not shown in FIG. 3) may be used to affix the aft bulkhead assembly 124 to the hose 108.

Figure 4:
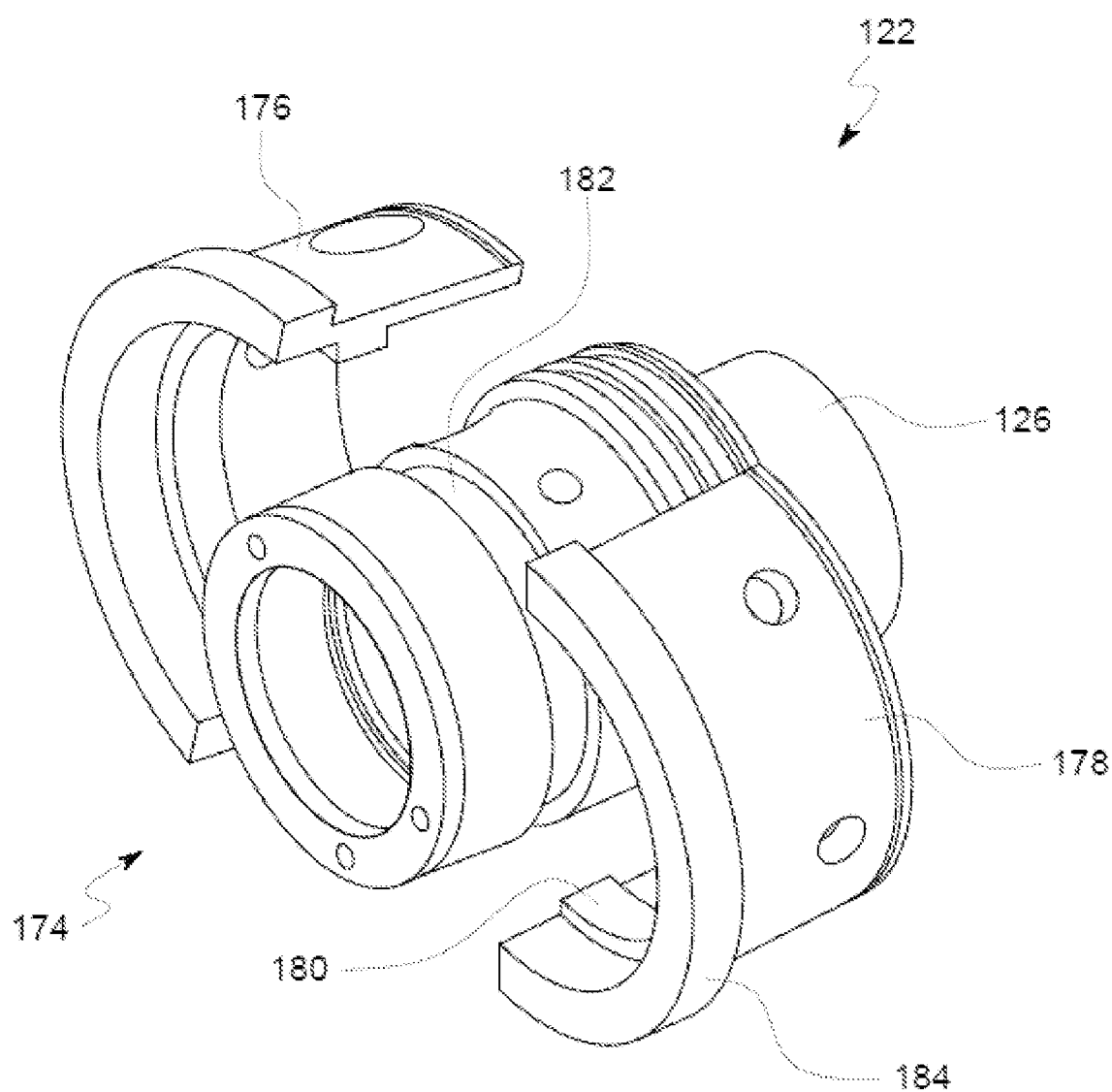
FIG. 4 is an exploded view of clamshell mechanism of the present invention.

As shown in FIG. 4, the forward bulkhead assembly 122 further includes a retainer 174 made of a two-piece clamshell of a first piece 176 and a second piece 178. The two half pieces of the retainer 174 (i.e., the first piece 176 and the second piece 178 of the clamshell) are installed on opposite sides of the forward bulkhead device 126. The retainer 174 includes an internal ridge 180 that corresponds with a groove or notch 182 circumscribing the forward bulkhead device 126. Additionally, the retainer 174 has a locking feature 184, such as a flange on a leading edge of the retainer 174. A locking ring 186 is attached to the locking feature 184. The locking feature 184 provides a bearing surface for the locking ring 186. The locking ring 186 may comprise a threaded collar that is used to mate and fix the forward bulkhead assembly 122 to the aft bulkhead assembly 124. The locking ring 186 has standard threads to mate with the aft bulkhead assembly 124.

When connecting the forward bulkhead assembly 122 to the aft bulkhead assembly 124, an alignment feature, such as pin 188 extending from the forward bulkhead device 126, may be used for initial alignment prior to engagement of the locking ring 186 and alignment of the forward electrical insert 128 with the aft electrical insert 134. Alignment of the forward bulkhead assembly 122 to the aft bulkhead assembly 124 is achieved through a pin 188 and an alignment receiver 190. Once aligned and engaged, o-rings 192 in grooves 194 protect the pins 130 installed in the forward electrical insert 128 and the pins 136 installed in the aft electrical insert 134 from the environment.

Figure 5:
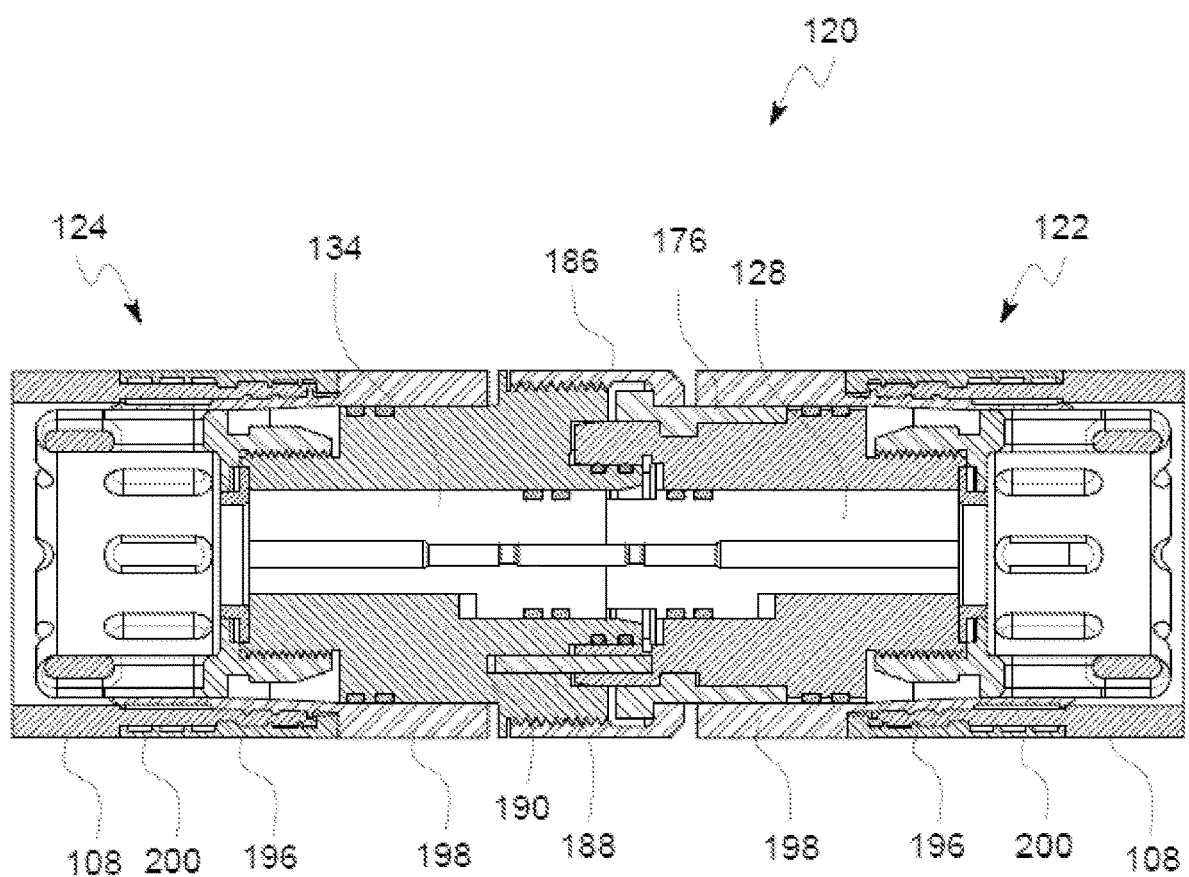
FIG. 5 is a cross section view of an assembled bulkhead of the present invention.

FIG. 5 shows a connector 120 consisting of an engaged assembly of the forward bulkhead assembly 122 attached to the aft bulkhead assembly 124. Each of the forward bulkhead assembly 122 and the aft bulkhead assembly 124 has a hose couplings 196 affixed to the forward bulkhead assembly 122 and to the aft bulkhead assembly 124 via mating ring 198. The mating ring 198 may be swaged to the hose 108 with swage coupling 200.

The bulkhead assemblies described herein can be booted with the optical and electrical connectors already terminated in the connector inserts and the connector insert installed in the bulkhead while providing a reduced number of leak paths and threads. This reduces the amount of time and effort for the pre-hose assembly, which otherwise would have to be pulled past the hose end in the booting process. Furthermore, this capacity may reduce the excess pre-hose length and improve towed array reliability by reducing stresses on optical and electrical components and wiring.

The invention may be constructed by various fabrication means and materials, such as additive manufacturing (AM), multi-material treatments, and multi-material compositions. Further, the invention may be constructed using various material types, such as titanium, aluminum, steel, high performance plastics, glass reinforced plastics, etc.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A bulkhead connector for an acoustic array, said bulkhead connector comprising:
   a forward bulkhead assembly with a forward bulkhead device containing a first electrical connector having first end connections for wires and optical fibers of the acoustic array with said forward bulkhead assembly having a clamshell-style ring with a locking feature, said ring split with two half circular pieces on opposite sides of said forward bulkhead device and a locking ring as part of said locking feature; and
   an aft bulkhead assembly with an aft bulkhead device containing a second electrical connector having second end connections for the wires and optical fibers of the acoustic array;
   wherein said locking ring is capable of connecting said forward bulkhead assembly with said aft bulkhead assembly.

2. The bulkhead connector in accordance with claim 1, wherein said forward bulkhead device further comprises a notch circumscribing said forward bulkhead device; and
   wherein each half piece of said clamshell-type ring includes an internal ridge that corresponds with said notch.

3. The bulkhead connector in accordance with claim 2, wherein said locking feature comprises a flange on a leading edge of each half piece of said clamshell-type ring wherein said locking feature provides a bearing surface for said locking ring.

4. The bulkhead connector in accordance with claim 3, said forward bulkhead assembly further comprising a first clevis threadedly engaged with said forward bulkhead device by having female threads engaging male threads on said forward bulkhead device.

5. The bulkhead connector in accordance with claim 4, said aft bulkhead assembly further comprising a second clevis threadedly engaged with said aft bulkhead device, said second clevis having female threads engaging male threads on said aft bulkhead device.

6. The bulkhead connector in accordance with claim 5, said bulkhead connector further comprising:
- a first alignment feature for aligning said first electrical connector with said second electrical connector; and
- a second alignment feature for aligning said forward bulkhead assembly with said aft bulkhead assembly.

7. The bulkhead connector in accordance with claim 6, wherein said first alignment feature comprises at least one first alignment pin extending from said first electrical connector and said second electrical connector includes at least one alignment hole corresponding to said at least one first alignment pin; and
- wherein said second alignment feature comprises at least one second alignment pin extending from said forward bulkhead assembly and said aft bulkhead assembly includes at least one alignment receiver corresponding to said at least one second alignment pin.

8. A hydrophone module, comprising:
- a housing tube with an elongated sleeve having a first end and a second end;
- a forward bulkhead assembly within said housing, said forward bulkhead assembly having a forward bulkhead device containing a first electrical connector having first end connections for wires and optical fibers with said forward bulkhead assembly including a clamshell-style ring with a locking feature, said ring split with two half circular pieces on opposite sides of said forward bulkhead device and a locking ring as part of said locking feature; and
- an aft bulkhead assembly within said housing, said aft bulkhead assembly having an aft bulkhead device containing a second electrical connector with second end connections for wires and optical fibers;
- wherein said locking ring is capable of connecting said forward bulkhead assembly with said aft bulkhead assembly.

9. The hydrophone module in accordance with claim 8, wherein said forward bulkhead device further comprises a notch circumscribing said forward bulkhead device; and
- wherein each half piece of said clamshell-type ring comprises an internal ridge that corresponds with said notch.

10. The hydrophone module in accordance with claim 9, wherein said clamshell-type ring further comprises a locking feature having a flange on a leading edge of each half piece of said clamshell.

11. The hydrophone module in accordance with claim 10, wherein said locking feature provides a bearing surface for said locking ring.

12. The hydrophone module according to claim 11, further comprising:
- a first alignment feature for aligning a first electrical connector enclosed in said forward bulkhead with a second electrical connector enclosed in said aft bulkhead; and
- a second alignment feature for aligning said forward bulkhead assembly with said aft bulkhead assembly.

13. The hydrophone module in accordance with claim 12, wherein said first alignment feature comprises at least one first alignment pin extending from said first electrical connector and said second electrical connector includes at least one alignment hole corresponding to said at least one first alignment pin; and
- wherein said second alignment feature comprises at least one second alignment pin extending from said forward bulkhead assembly and said aft bulkhead assembly includes at least one alignment receiver corresponding to said at least one second alignment pin.

* * * * *